United States Patent [19]
Savit
[11] Patent Number: 4,461,787
[45] Date of Patent: Jul. 24, 1984

[54] METHOD FOR INCREASING THE THROUGH-CONDUCTIVITY OF A CELLOPHANE SUBSTRATE

[76] Inventor: Joseph Savit, 751 Vernon Ave., Glencoe, Ill. 60022

[21] Appl. No.: 424,787

[22] Filed: Sep. 27, 1982

Related U.S. Application Data

[63] Continuation of Ser. No. 216,730, Dec. 15, 1980, abandoned.

[51] Int. Cl.[3] ........................ B05D 5/12; B32B 23/08; B32B 31/22

[52] U.S. Cl. .................................... 427/121; 427/365; 427/393.1; 427/394; 427/434.2; 427/439; 428/508; 428/510

[58] Field of Search ...................... 427/121, 365, 393.1, 427/394, 434.2, 439; 428/510, 532, 508

[56] References Cited

U.S. PATENT DOCUMENTS

| | | | |
|---|---|---|---|
| 2,321,762 | 6/1943 | McDermott | 428/532 |
| 2,621,135 | 12/1952 | Brillhart | 428/532 |
| 2,748,014 | 5/1956 | Stahl et al. | 106/187 |
| 3,009,831 | 11/1961 | Wilfinger | 428/532 |
| 3,011,918 | 12/1961 | Silvernail et al. | 427/121 |
| 3,248,279 | 4/1966 | Geyer | 430/69 |
| 3,442,697 | 5/1969 | Kane | 428/510 |
| 3,447,948 | 6/1969 | Koch | 427/121 |
| 3,705,938 | 12/1972 | Hyman | 428/907 |
| 3,975,305 | 8/1976 | Tai et al. | 427/121 |
| 4,096,288 | 6/1978 | Saito | 427/121 |
| 4,139,675 | 2/1979 | Nagai et al. | 428/510 |
| 4,214,031 | 7/1980 | Miyakawa et al. | 427/121 |
| 4,259,425 | 3/1981 | Seslin | 427/121 |

OTHER PUBLICATIONS

Monsanto Technical Bulletin, "GELVA Multipolymer Solutions", Bulletin No. 6081.

Kimberly-Clark Corp., "Resistivity Testing Methods for Conductive Base Paper", by T. E. Cooprider.

Paper, Film and Foil Converter, "Fundamentals to Consider in Selecting Coating Methods," by R. J. Jacobs.

Hercules, "Nitrocellulose Chemical and Physical Properties".

Hercules Product Data Number 106-2, "Hercules Nitrocellulose".

Monsanto Data Sheet Publication #6035A, "GELVA Multipolymer Solution 270 For Adhesive, Specialty Coating and Printing Ink Applications."

Monsanto Technical Bulletin No. 6070A, "BUTVAR Polyvinyl Butyral, FORMVAR Polyvinyl Formal Properties and Uses".

Monsanto Data Sheet No. 6326A, "Dielectric Coatings, Pigments for Dielectric Coatings".

Freeport Kaolin Company Technical Data, "Translink 37".

Monsanto Data Sheet, "Preparation of Dielectric Coatings Based on BUTVAR B-76 and GELVA Multipolymer Solutions (GMS) 270T and RP-2277".

Calgon Specialty Products Bulletin, "Conductive Polymer 261 LV, (Product 6118)", Bul. 28-4, Calgon Corp., 1978.

Hackh's Chemical Dictionary, 4th Ed., 1969, pp. 140-141, 572-573 and 713.

*Primary Examiner*—Michael R. Lusignan
*Assistant Examiner*—Richard Bueker
*Attorney, Agent, or Firm*—Lester J. Savit

[57] ABSTRACT

A method and chemical solutions for use in increasing the surface and volume conductivities of a cellophane substrate. The substrate can be used for dielectric copying or any other purpose for which a through-conductive substrate is required.

8 Claims, 3 Drawing Figures

METHOD FOR INCREASING THE THROUGH-CONDUCTIVITY OF A CELLOPHANE SUBSTRATE

This application is a division of application Ser. No. 06/216,730, filed Dec. 15, 1980, now abandoned.

BACKGROUND OF THE INVENTION

1. Field of the Invention

This invention relates to printing medium, and more specifically to medium useful for dielectric copying, printing, plotting and recording.

2. Description of the Prior Art

Methods for dielectric copying, printing, etc. are well known in the prior art. See for example, the copending patent application by Rutherford, et al. filed June 3, 1980 and assigned Ser. No. 155,937. Prior art methods for dielectric copying and printing etc., require a printing medium substrate which is through-conductive, and which contains a dielectric coating on one surface. Such a prior art dielectric recording medium is shown in FIG. 1. Prior art recording medium 99 is comprised of "through-conductive" material 100 having top surface 101 and bottom surface 102. For the purpose of this specification, a material such as material 100 is "through-conductive" when an electric current can be made to flow between top surface 101 and bottom surface 102 in response to an electrical potential applied between surfaces 101 and 102 such that the material is appropriate for use in dielectric copying machines of a type well-known in the art. Such dielectric copy machines comprise, for example, the Benson-Varian Model 9336 manufactured and sold by Benson-Varian Incorporated, 385 Ravendale Drive, Mountain View, Calif. 94043. Dielectric insulating material 105 is applied as a coating on top surface 101 of recording medium 100. Prior art dielectric recording medium used either paper or vellum as through-conductive material 100. While paper and vellum are not normally through-conductive, by applying a conductive chemical solution, the paper or vellum will absorb this chemical solution and thus become conductive. Prior art materials which can be made through-conductive are limited to paper or vellum, in that other material useful for drafting or printing purposes, such as mylar (a trademark of Dupont), polyester film, and acetate film have volume resistivities in excess of $10^{14}$ ohms-in, surface resistivities in excess of $10^{14}$ ohms/square, and are impervious to known conductive chemical solutions.

For the recording medium shown on FIG. 1, images may be printed thereon by well-known techniques. Such techniques apply an electric potential to through-conductive material 100, while passing top surface 106 of dielectric coating 105 past a recording head containing numerous styli. The styli are controlled to apply an electric charge to top surface 106 of dielectric coating material 105 at desired locations. Recording medium 100 then acts as a capacitor with points of charge stored on surface 106. A liquid toner solution containing carbon particulates is then applied to surface 106, with carbon particulates adhering to the locations on surface 106 corresponding to said stored points of charge. Surface 106 is then dried and developed, firmly affixing the carbon particles to surface 106 where points of charge had previously been stored. In this fashion, a permanent print is obtained.

One of the disadvantages with prior art dielectric recording methods is that only paper or vellum can be used, in that other common drafting or printing materials cannot be made through-conductive. Paper and vellum are much more easily damaged than other media such as mylar or acetate film and are substantially non-transparent.

SUMMARY OF THE INVENTION

In accordance with this invention, a durable, transparent medium for dielectric copying, printing, plotting and recording is formed. This medium is useful as an original from which blueprints are made, for overlays, and for overhead projections. The dielectric coated recording medium of this invention comprises a through-conductive substrate coated with a dielectric material. In one embodiment, the substrate comprises two cellophane layers bonded together with an adhesive and subjected to a conductive treatment to decrease its surface and volume resistivities. The top of the substrate is coated with a dielectric layer. The finished substrate is then used for the formation of images in the same manner as are the prior art substrates.

In one embodiment, the solution to which the substrate is subjected to make it conductive comprises a mixture of water, ethylene glycol monomethyl ether and Calgon 261LV. In another embodiment, the solution used to make the substrate conductive comprises a mixture of water, isopropyl alcohol and Calgon 261LV.

This invention will be more fully understood in view of the following detailed description taken together with the drawing.

DETAILED DESCRIPTION OF THE INVENTION

Figure 1:
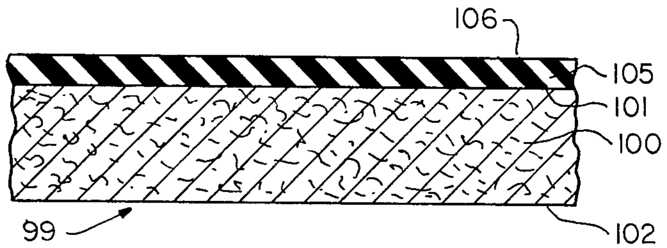
FIG. 1 is a cross-sectional view of a prior art dielectric coated recording medium.
Figure 2:
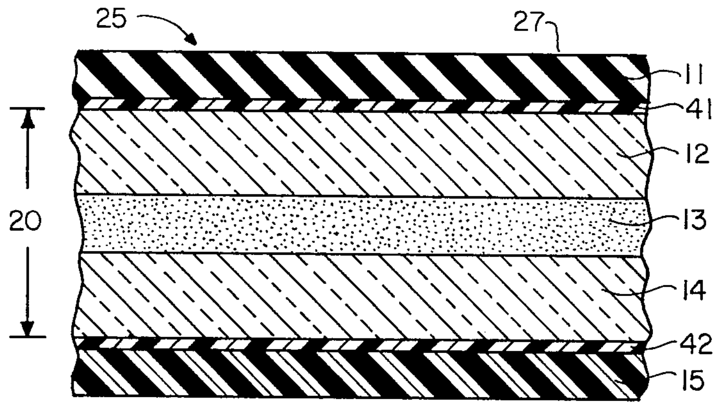
FIG. 2 is a cross-sectional view of a dielectric coated recording medium with transparent conductive base constructed in accordance with this invention.

Referring to FIG. 2, recording medium 25 is comprised of substrate 20, dielectric coating layer 11, and conductive resin coating 15. Substrate 20 is a transparent laminate comprised of cellophane layers 12 and 14, bonded together by adhesive layer 13 as shown. Adhesive 13 may comprise Monsanto Gelva Multipolymer Resin Solution 270, a polyvinyl acetate multipolymer resin solution described in Monsanto data sheet number 6035A, which is hereby incorporated by reference. Alternatively, adhesive 13 may be comprised of Monsanto Gelva Multipolymer Solution 263, an acrylic resin solution, Monsanto Gelva 264, a polyvinyl acetate-maleate copolymer, or any suitable adhesive which will not prevent the substrate from being made sufficiently through-conductive. Gelva multipolymer solutions are described by Monsanto, St. Louis, MO, in their Technical Bulletin No. 6081, which is hereby incorporated by reference. The typical thickness of each cellophane layer 12 and 14 is approximately 0.001 inch. Such a substrate can be made through-conductive by the application (utilizing standard, well-known application techniques) of a unique, specially formulated conductive chemical solution (to be described below) which is absorbed by the substrate 20. A substrate comprised of any number of cellophane layers, including a single cellophane layer, may be used, if desired.

Such a transparent laminate, comprising two layers of cellophane bonded together, is manufactured and sold by OLIN Corporation under their stock numbers 64CC-76 and 128PUT. This material is sold for use in wrapping and packaging. Bonded layers of cellophane are preferred because of the difficulties in forming a single, thick sheet of cellophane. Thick sheets of cellophane are used for durability and toughness. In the past, cellophane has not been used for dielectric printing, due to a number of factors including the facts that (1) most commercially available cellophane is one-ply and thus lacks the thickness, durability and rigidity required for printing media;

(2) prior art conductive solutions used to make prior art dielectric printing media will not be readily absorbed by cellophane; and (3) the electrical characteristics of cellophane are not widely known.

This invention overcomes these difficulties by using multiple-ply cellophane laminate, such as manufactured by Olin Corporation, to achieve the thickness, durability and rigidity required for printing media having a long life. This laminate is treated with my unique conductive chemical solution, which I formulated specifically for its characteristics of being readily absorbed by cellophane, thus permitting the transparent dielectric recording medium of this invention to be made through-conductive.

This cellophane laminate, prior to being subjected to the process which makes it through-conductive, has a surface resistivity within the range of approximately $2\times10^9$ to $3\times10^{11}$ ohms/square, and a volume resistivity within the range of approximately $1\times10^8$ to $1\times10^{10}$ ohms-in, depending on the amount of moisture in the laminate due to the relative humidity. Methods of testing conductivity in the paper industry are described in "Resistivity Testing Methods for Conductive Base Paper", by T. E. Cooprider, Technical Association of the Paper and Pulp Industry (TAPPI) 51(11) 520-7 (1968).

The cellophane laminate inherently is not through-conductive. To make the laminate through-conductive, it is subjected to a process which involves submerging the laminate in a selected solution for a selected time, and then pressing the laminate to remove excess solution and to ensure complete penetration of the solution through the laminate, and finally drying the laminate before winding the laminate on a roll.

One preferred conductive treatment solution comprises approximately 2% to 20% by volume of Calgon 261LV) which is the conductive material in the conductive treatment solution which causes the increased conductivity of the substrate, approximately 3% to 30% by volume water, and approximately 95% to 50% by volume of ethylene glycol monomethyl ether, by volume. The optimum ratio, by volume, is approximately 10% Calgon 261LV, 15% water, and 75% ethylene glycol monomethyl ether. As the proportion of Calgon 261LV in the conductive coating solution is increased, the volume conductivity of the treated substrate increases, until the point where the viscosity of the solution is so great that the ability of the conductive treatment solution to penetrate the substrate is degraded, thus resulting in a decrease in the volume conductivity of the treated substrate. The optimum ratios given result in a substrate with maximum volume conductivity after treatment.

A second conductive treatment solution which may be used comprises approximately 2% to 20% of Calgon 261LV, 96% to 60% water, and 2% to 20% isopropyl alcohol, all by volume. The approximate optimum composition of this second conductive treatment solution, by volume, is 10% Calgon 261LV, 80% water, and 10% isopropyl alcohol. Methanol may also be used as a solvent to form a solution containing Calgon 261LV for use as a conductive treatment solution. The solvent used must be capable of providing a conductive treatment solution which will penetrate the substrate, thus increasing its volume conductivity.

Calgon 261LV is sold by the Calgon Corporation, Pittsburg, PA. Calgon 261LV is a water-soluble, electroconductive quaternary ammonium polymer, and is described in U.S. Pat. No. 3,288,770, and also in Calgon Corporation Specialty Products Bulletin Number 28-4, both of which are hereby incorporated by reference.

The use of a large proportion of ethylene glycol monomethyl ether in the conductive treatment solution provides better penetration of the substrate, and thus better volume conductivity, than solutions using water as the solvent. Furthermore, ethylene glycol monomethyl ether dries more readily than water, and provides a non-slippery or "grease-free" substrate surface after drying. Prior art methods of increasing the through-conductivity of prior art paper substrates do not use ethylene glycol monomethyl ether due to its relatively high cost, and the fact that water is an adequate solvent for use with paper substrates.

Conductive treatment solutions may also be formulated comprising other electro-conductive quaternary ammonium compounds, such as the vinylbenzyl quaternary ammonium compounds disclosed by Silvernail, et al. in U.S. Pat. No. 3,011,918, issued Dec. 5, 1961. Other materials may be used to fabricate a through-conductive treatment solution, such as common salts, including sodium chloride. However, the conductive treatment must be readily absorbed by cellophane, and should not cause corrosion of printing equipment, as does salt.

The conductive treatment solutions described herein may also be used to increase the through-conductivity of prior art paper substrates.

Figure 3:
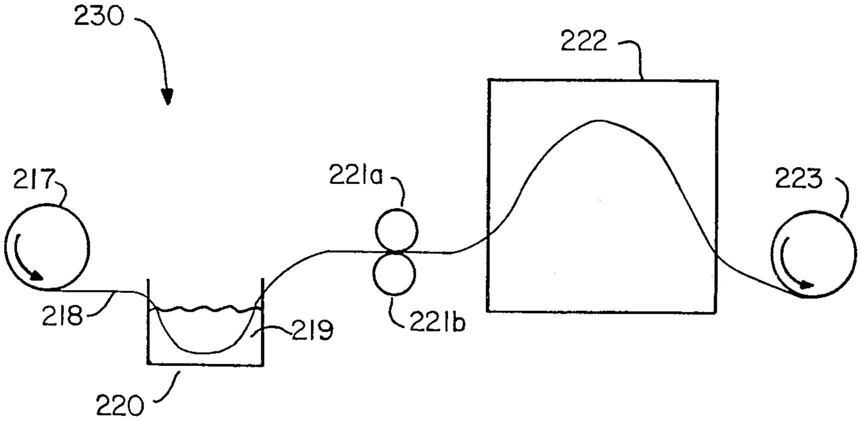
FIG. 3 illustrates schematically the process used to make the substrate of this invention through-conductive.

The conductive treatment solution is, in one embodiment, applied to the cellophane substrate in the following manner, as depicted in FIG. 3. Cellophane substrate 218 is contained on feed roll 217. Substrate 218 is caused to flow through conductive treatment mechanism 230 at a speed of approximately 100 ft. per minute. Conductive treatment solution 219, preferably at room temperature and having a viscosity of approximately 19 seconds, as measured with a Zahn cup #2, is contained within tank 220, with approximately 14 inches length of cellophane substrate being submerged in conductive treatment solution 219 at any one time. Other well-known methods of measuring the viscosity of conductive treatment solution 219 may be used. Nip rolls 221*a* and 221*b* are located approximately 6 feet from tank 220. Nip roller 221*a* is comprised of rubber, and nip roller 221*b* is comprised of steel, although the use of these materials is not critical. Nip rollers 221*a* and 221*b* may be comprised of other materials. Nip rollers 221*a* and 221*b* remove excess conductive treatment solution from cellophane substrate 218, to facilitate drying, and to squeeze conductive treatment solution into said cellophane substrate to provide better, and more uniform, through-conductivity. The pressure exerted on the cellophane substrate by the nip rollers is approximately 45-60 psi, although this is not critical. Cellophane substrate 218 then enters heated air dryer oven 222, located approximately 4 feet from nip roller 221*a* and 221*b*. The temperature of oven 222 is 125° F., although any temperature and oven length suitable for drying the substrate may be used. Approximately 20 feet of cellophane substrate 218 is contained in heated air oven 222 at any given time. The dry cellophane substrate 218 exits from heated air oven 222 and is wound on wind-up roll 223. This treatment reduces the surface resistivity of the cellophane substrate from approximately $10^{11}$ to $10^9$ ohms/square to approximately $10^9$ to $10^7$ ohms/square. This treatment also reduces the volume resistivity from approximately $10^{10}$ to $10^8$ ohms-inch to approximately $10^9$ to $10^7$ ohms-inch. Any other suitable methods of applying conductive treatment solution may be used, such as those referred to in "Fundamentals to Consider in Selecting Coating Methods" by R. J. Jacobs, "Paper Film and Foil CONVERTER", Feb.-July 1963, published by Maclean-Hunter Publishing Corporation, Chicago, ILL. Thin (approximately 0.1 mil thick) intermediate conductive coating layers 41 and 42, comprised mostly of Calgon 261LV, are formed on the surfaces of substrate 20 (as shown in FIG. 2) by this application of conductive treatment solution.

Conductive coating 15 is applied to cellophane layer 14 of substrate 20 of FIG. 2 by well-known techniques to a thickness within the range of approximately 0.5 to 3.5 mils, which is equivalent to approximately ½ pound to approximately 4 pounds of conductive coating material per 3,000 square feet of substrate surface area. One preferred method of applying conductive coating 15 is to utilize a Mayer rod coater such as manufactured by Black Clawson Company, or the Midland Ross Company of New Jersey, with a #20 Mayer rod and a web speed of approximately 1000 yards/hour. Conductive coating solution is applied at room temperature with a viscosity of approximately 25 seconds, as measured using a Zahn cup #2. The first 20 foot-long hot air dryer oven of the Mayer rod coater is set at 125° F. and the second 20 foot hot air dryer oven is set at 150° F. The use of a Mayer rod coater is described in "Fundamentals to Consider in Selecting Coating Methods", R. J. Jacobs, cited previously.

The conductive coating mixture is comprised of approximately 17.7% binder in the form of Hercules nitrocellulose RS ½ sec. sold by Hercules, Incorporated, Wilmington, Del., and disclosed both in Hercules Product Data Sheet No. 106-2 and in "Nitrocellulose Chemical and Physical Properties", by Hercules, Inc., 1969 both of which are hereby incorporated by reference. The conductive coating mixture is also comprised of approximately 7.6% isopropyl alcohol, 23.8% toluene, and 50.9% propylene glycol methyl ether, by weight. Conductive pigment, such as zinc oxide in the form of New Jersey Zinc HC238 sold by Natural Resources Group, Gulf and Western Industries, Bethlehem Pa., may be added to the conductive coating mixture to provide the desired conductivity and opacity of the finished recording medium. Conductivity and opacity are increased with increasing density of pigment. Conductive pigment is also used to provide a surface with roughness sufficient to permit hand-written annotations on the surface of conductive coating 15. Conductive zinc oxide pigment may be added up to a maximum of approximately 10 parts pigment per one part binder, by weight. The optimum amount of pigment to achieve good conductivity and translucence is approximately ½ part pigment to 1 part binder, by weight. Other conductive pigments such as carbon black, metal particles, cupric iodide, salts, etc, may be used. Hercules Nitrocellulose RS ½ sec may also be used with other alcohol base solvents. Other Nitrocellulose (cellulose nitrate) compounds may be used, having viscosity other than ½ sec. Contrary to what might be expected, the use of Nitrocellulose conductive coating on a cellophane substrate results in a safe printing medium which burns approximately 4 to 5 times slower than polyester or mylar, and approximately 2 times slower than paper or vellum.

In some instances, conductive coating 15 need not be applied. The surface conductivity will be sufficiently low after the application of conductive solution (due to the presence of thin intermediate conductive layer 42) to form an effective dielectric recording medium. However, in this case, pigment can not be applied to the bottom surface of substrate 20 by adding it to the conductive coating 15. However, the use of conductive coating 15 is preferred to increase the durability and thickness of the dielectric recording medium and to permit hand-written annotations with common writing implements, i.e., ballpoint pen, pencil, etc. Conductive coating 15 also serves as a humidity barrier, tending to prevent large changes in the moisture content of the recording medium in response too large changes in the ambient relative humidity.

The conductive coating solution and method of application described herein may also be used in the fabrication of dielectric coated recording media which utilize paper substrates.

Dielectric coating 11 is then applied to layer 41, which coats cellophane layer 12 of substrate 20 by well-known techniques to a thickness of approximately 0.0001 to 0.001 inches, which is equivalent to approximately one to eight pounds of dielectric coating material per 3,000 square feet of substrate surface area. The optimum thickness of dielectric coating 11 is approximately 6 pounds per three thousand square feet of substrate surface area. Dielectric coating 11 is formed by the application of a liquid dielectric coating solution which is comprised of approximately 14% by weight Monsanto Butvar B79, (a polyvinyl butyral which serves as a binder, and is sold by Monsanto Polymers and Petrochemicals Co., St. Louis, MO, and described in their Technical Bulletin No. 6070A, which is hereby incorporated by reference), approximately 47.4% by weight toluene, and approximately 31.6% by weight propylene glycol methyl ether. Non-conductive pigment, such as aluminum silicate in the form of Freeport Kaolin Translink #37, sold by Freeport Kaolin Company, New York, N.Y. and disclosed in Kaolin Technical Data Bulletin "Translink 37", which is hereby incorporated by reference, may be added within the range of approximately 1 part pigment per 4 parts binder to 4 parts pigment per 1 part binder, by weight. The optimum amount of Translink #37 pigment is approximately 1 part pigment per 2 parts binder, by weight. Any suitable non-conductive pigment, or combinations thereof, may be used, such as Ansilex 93 sold by Englehard Chemical, New Jersey, or titanium dioxide, barium sulfate, calcium carbonate, clay, pigment OX-2 or lithopone, all of which are described in Monsanto Data Sheet No. 6326A, which is hereby incorporated by reference.

The addition of one or more non-conductive pigments to the dielectric coating 11 serves several purposes. First, such pigments provide a tint, and thus the opacity which is desired for some uses. Secondly, such pigments roughen the top surface of the recording medium, thus providing the correct average thickness required of the printing medium by the printing station and permitting hand-written annotations to be made using common writing implements such as pen and pencil. Thirdly, the use of such pigments increases the dielectric constant of dielectric coating 11, thus increasing the capacitance of the recording medium, and thus the ability of the recording medium to store an electric charge during the printing process. Finally, the use of pigments in dielectric layer 11 provides increased "tooth" or the ability of the surface to maintain the integrity of the developed image after toning, thus preventing smearing of the printed matter.

Monsanto Butvar B-79 is a polyvinyl butyral. Other polyvinyl butyrals may be used, including Monsanto Butvar B-76, which is described in Monsanto Data Sheet No. 6326A, which is hereby incorporated by reference.

Lithopone is a white pigment comprising zinc sulfide, barium sulfate and some zinc oxide. Lithopone is described in the "Merck Index and Encyclopedia of Chemicals and Drugs", 9th Edition, published by Merck & Co., Inc., Rahway, N.J., 1976, page 723, item 5389. Pigment OX-2 is an aluminum silicate compound and is manufactured by Freeport Kaolin Company, New York, N.Y.

Dielectric coating 11 may be applied to a cellophane substrate utilizing a Mayer rod coater, with a number 36 Mayer rod. With the room temperature dielectric coating material to be applied adjusted to a viscosity of approximately 60 seconds using a Zahn cup #2 by adjusting the proportion of each chemical component, the substrate may be coated at approximately 800 yards per hour, and dried with the first 20 foot long Mayer hot air dryer oven set at 125° F. and the second 20 foot long Mayer hot air dryer oven set at approximately 175° F. Other suitable methods of applying dielectric coating 11 may be used and are not described here because they are well-known in the prior art.

Conductive resin layer 15 provides electrical conductivity during the printing process in which the medium is used. Dielectric coating layer 11 and conductive layer 15 are designed to be either clear (non-pigmented) when applied to substrate 20, for a transparent configuration, or pigmented when applied to substrate 20, to provide a frosted or opaque configuration. Dielectric coating 11 serves to provide a means to store electrical charge on surface 27 of recording medium 25. Conductive resin layer 15 and dielectric coating layer 11 also provide increased strength and durability, and form a humidity barrier, resulting in a substrate with relatively constant moisture content over a wide range of ambient relative humidity. This relatively constant moisture content results in a substrate which has improved dimensional stability and curl balance compared to prior art substrates.

The recording material of this invention is much more durable than paper, thus providing a greater lifetime for prints using this material. The recording medium of this invention may also be made more transparent than paper, with transparency of approximately 75% in the visible light range, thus allowing more effective use of overlays than the prior art dielectric medium of paper or vellum. This paper or vellum has a transparency of approximately 10% to 50%; however, as the transparency of paper increases, the durability decreases markedly. This invention provides higher quality reproduction when using blueprint copy machines than prior art recording media. This invention also has better dimensional stability than paper. Paper and vellum have dimensional stabilities on the order of 3% for a change from 20% relative humidity to 80% relative humidity. The recording material of this invention has a dimensional stability on the order of 0.5% over this range of relative humidity. Thus, an approximately six-fold improvement in dimensional stability over prior art dielectric recording medium is achieved with the dielectric recording medium of this invention. The recording medium of this invention is also less expensive than polyester materials, and, in contrast to polyester or acetate material, has enough through-conductivity to permit electrostatic printing. The recording medium of this invention may be used in standard dielectric printing processes and allows hand-written annotations to be made on both its surfaces with common writing instruments. The recording medium of this invention is less combustible than polyester, mylar, paper and vellum. The cellophane substrate used in this invention is not made from petrochemicals, as is polyester or mylar, thus contributing to its low cost.

While various ratios, temperatures, times and distances have been stated with respect to the process for manufacturing the recording medium of this invention, it is to be understood that these values are not critical, and unless specifically stated to be otherwise these values are not to be interpreted as limitations of this invention.

I claim:

1. The method of increasing the through-conductivity of a cellophane laminate substrate comprising the steps of:

submerging said substrate for a selected time in a conductive solution at room temperature, said conductive solution comprising a quaternary ammonium polymer and ethylene glycol monomethyl ether; and drying said substrate upon removal from said solutions.

2. The method of claim 1 wherein said step of submerging comprises moving said substrate at a selected speed and passing said substrate through said conductive solution.

3. The method as in claim 1 wherein said substrate is dried by:

passing said substrate through a pair of rollers to squeeze a portion of the solution into the substrate and to remove excess fluid from the substrate, and drying said substrate.

4. The method as in claim 1 wherein said conductive solution further includes water.

5. The method as in claim 1 wherein about 20% by volume of said conductive solution is the quaternary ammonium compound.

6. The method of increasing the through-conductivity of a cellophane laminate substrate comprising the steps of:

submerging said substrate for a selected time in a conductive solution at room temperature, said conductive solution comprising approximately 25–90% by volume of ethylene glycol monomethyl ether and 2 to 20% of a water-soluble quaternary ammonium polymer by volume; and drying said substrate.

7. The method of claim 6 wherein said step of submerging comprises moving said substrate at a selected speed and passing said substrate through said conductive solution.

8. The method as in claim 6 wherein excess solution is removed from the substrate by:

passing said substrate through a pair of rollers to squeeze a portion of said solution into the substrate and to remove excess fluid from the substrate, and drying said substrate.

* * * * *